(No Model.)
J. WARREN.
Cotton-Chopper.
No. 227,864.  Patented May 18, 1880.
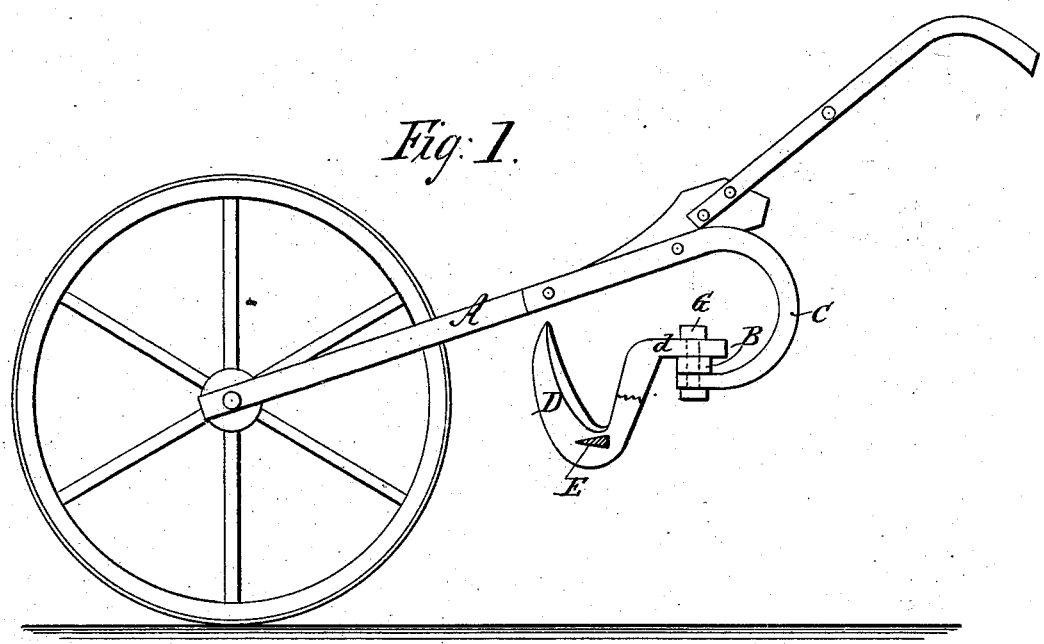
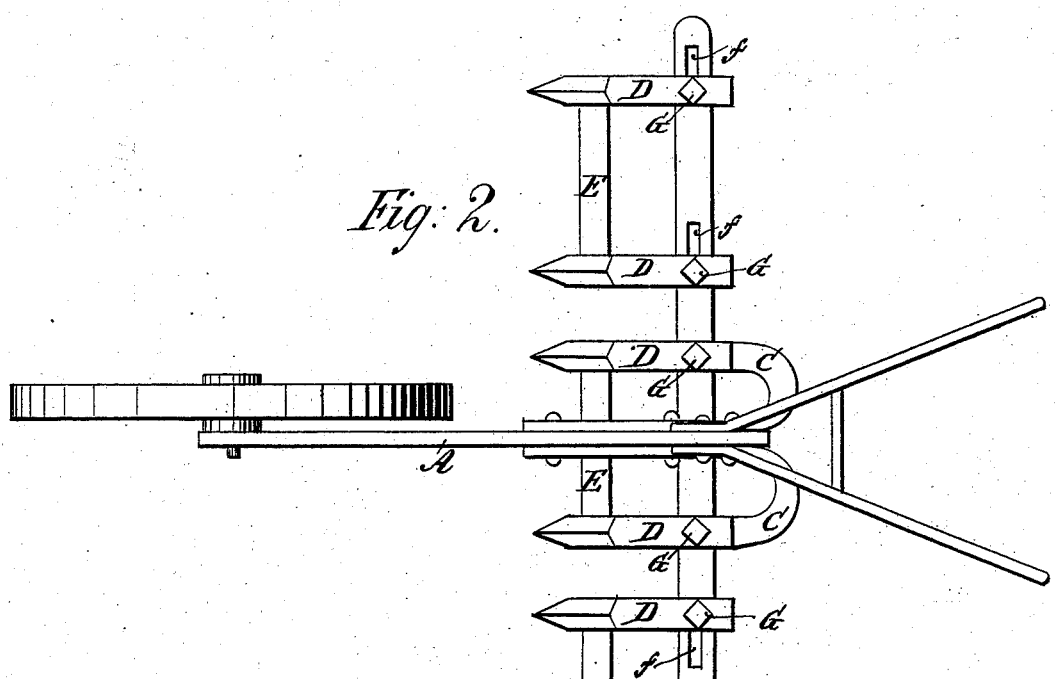
WITNESSES:
A. Schehl.
C. Sedgwick
INVENTOR:
J. Warren
BY Munn & Co.
ATTORNEYS.

UNITED STATES PATENT OFFICE.

JOHN WARREN, OF NEWTON FACTORY, GEORGIA.

COTTON-CHOPPER.

SPECIFICATION forming part of Letters Patent No. 227,864, dated May 18, 1880.

Application filed March 22, 1880. (No model.)

*To all whom it may concern:*

Be it known that I, JOHN WARREN, of Newton Factory, in the county of Newton and State of Georgia, have invented a new and useful Improvement in Cotton-Choppers, of which the following is a specification.

The invention consists in combining with curved arms blades having upwardly-turned cutting ends, a horizontal blade, and a slotted bar, as hereinafter described.

The accompanying drawings represent an apparatus embodying my improvements, Figure 1 being a side view, and Fig. 2 a top view.

Similar letters of reference indicate corresponding parts.

A represents the draft-beam, carrying a wheel at the front end and handles at the rear.

B is a horizontal bar, attached midway of its length to the beam A, in a direction transversely to the line of travel of the apparatus, by means of two curved bars, C C, which are bolted to the beam A at their upper ends and to the bar B at their lower ends. Said bars C C are curved rearward, parallel with the length of the beam A, then downward and laterally, and then forward longitudinally of the beam.

The chopper consists of two curved vertical blades, D D, connected by a straight horizontal blade, E, the ends of which are bolted, riveted, or otherwise secured in said blades D D.

The curved blades D D are in shape somewhat resembling a short scythe, but with the cutting-edge reversed. Their shanks $d\ d$ are perforated, and they are secured to the transverse bar B by bolts G G passing through these perforations and through slots $f f$ in the bar B, and secured by nuts.

By means of the slots $f f$ the chopper may be adjusted laterally. The apparatus may be provided with any suitable number of these choppers. As here shown, there are three, all resembling each other in construction and arrangement.

Having thus fully described my invention, I claim as new and desire to secure by Letters Patent—

The combination, with the curved bars C, of the blades D, having their cutting ends turned upward, the horizontal blade E, and the bar B, with slots $f f$, whereby provision is made for the lateral adjustability of the blades, as specified.

JOHN WARREN.

Witnesses:
I. B. MARK,
F. D. WARDLAW,
J. F. VINING.